(12) United States Patent
Kim et al.

(10) Patent No.: US 11,909,084 B2
(45) Date of Patent: Feb. 20, 2024

(54) ELECTROLYTE MEMBRANE WITH IMPROVED ION CONDUCTIVITY AND METHOD FOR MANUFACTURING THE SAME

(71) Applicants: Hyundai Motor Company, Seoul (KR); Kia Corporation, Seoul (KR)

(72) Inventors: Byoungsu Kim, Gyeonggi-do (KR); Bo Ki Hong, Seoul (KR); Ji Hoon Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 163 days.

(21) Appl. No.: 17/317,352

(22) Filed: May 11, 2021

(65) Prior Publication Data

US 2022/0181667 A1    Jun. 9, 2022

(30) Foreign Application Priority Data

Dec. 7, 2020    (KR) .................. 10-2020-0169407

(51) Int. Cl.
*H01M 8/1051*    (2016.01)
*H01M 4/90*    (2006.01)
(Continued)

(52) U.S. Cl.
CPC ....... *H01M 8/1051* (2013.01); *H01M 4/9075* (2013.01); *H01M 8/1027* (2013.01);
(Continued)

(58) Field of Classification Search
CPC . H01M 2008/1095; H01M 2300/0082; H01M 2300/0094; H01M 4/9075;
(Continued)

(56) References Cited

U.S. PATENT DOCUMENTS 9,847,533 B2    12/2017    Berta et al.
10,388,966 B2    8/2019    Kondou et al.
(Continued)

FOREIGN PATENT DOCUMENTS

CN    101304091 A    11/2008
CN    101444710 A    6/2009
(Continued)

OTHER PUBLICATIONS

Preparation of liquid-phase reduction method-based Pt/TiO2 catalyst and reaction characteristics during HCHO room-temperature oxidation; Hanki, Eom et al; Ind. Eng. Chem. Res. 2020, 59, 35, 15489-15496 (Year: 2020).*

(Continued)

*Primary Examiner* — Brian R Ohara
(74) *Attorney, Agent, or Firm* — Fox Rothschild LLP (57) ABSTRACT

Disclosed are an electrolyte membrane with improved ion conductivity and enhanced water transport and a method for manufacturing the same. The electrolyte membrane includes an ion transport layer including an ionomer having proton conductivity and a catalyst dispersed in the ion transport layer, and the catalyst includes a support including a shell configured to have a designated shape and size and to be hollow and at least one hole configured to allow an inner space to communicate with an outside therethrough, and a metal supported on the support.

19 Claims, 7 Drawing Sheets

(51) Int. Cl.
*H01M 8/1027* (2016.01)
*H01M 8/1032* (2016.01)
*H01M 8/1039* (2016.01)
*H01M 8/1069* (2016.01)
*H01M 8/10* (2016.01)

(52) U.S. Cl.
CPC ....... *H01M 8/1032* (2013.01); *H01M 8/1039* (2013.01); *H01M 8/1069* (2013.01); *H01M 2008/1095* (2013.01); *H01M 2300/0082* (2013.01); *H01M 2300/0094* (2013.01)

(58) Field of Classification Search
CPC ............. H01M 8/1027; H01M 8/1032; H01M 8/1039; H01M 8/1051; H01M 8/1069
See application file for complete search history.

(56) References Cited

U.S. PATENT DOCUMENTS

| | | | |
|---|---|---|---|
| 2009/0136816 A1 | 5/2009 | Kang et al. | |
| 2014/0205929 A1 | 7/2014 | Mashio et al. | |
| 2014/0255786 A1 | 9/2014 | Oh et al. | |
| 2016/0372757 A1 | 12/2016 | Kim et al. | |
| 2018/0083291 A1* | 3/2018 | Kondou | B01J 23/42 |
| 2018/0301726 A1* | 10/2018 | Shintani | H01M 4/926 |
| 2019/0198903 A1* | 6/2019 | Park | H01M 8/1004 |

FOREIGN PATENT DOCUMENTS

| | | |
|---|---|---|
| CN | 105680054 A | 6/2016 |
| CN | 110444774 A | 11/2019 |
| JP | 2002-257388 A | 9/2002 |
| JP | 2006-140030 A | 6/2006 |
| JP | 2020-042927 A | 3/2020 |
| KR | 2008-0047574 A | 5/2008 |
| KR | 2015-0053723 A | 5/2015 |
| KR | 10-2018-0062213 A | 6/2018 |
| KR | 102015028 B1 | 8/2019 |
| KR | 102055731 B1 | 12/2019 |
| KR | 2020-0077014 A | 6/2020 |
| KR | 2020-0114423 A | 10/2020 |
| KR | 2020-0120008 A | 10/2020 |

OTHER PUBLICATIONS

D. E. Curtin et al., J. Power Sources, 131, 41-48 (2004).
A. P. Young et al., J. Electrochem. Soc., 157, B425-B436 (2010).
P. Trogadas et al., Electrochem. Solid-State Lett., 11, B113-B116 (2008).
R. Uegaki et al., J. Power Sources, 196, 9856-9861 (2011).
D. Zhao et al., J. Power Sources, 190, 301-306 (2009).
R. W. Cahn et al., Mater. Sci. & Technol., Ch. 10, Wiley-VCH Verlag, GmBH (2000).
E. Endoh, ECS Trans., 16, 1229-1240 (2008).
E. Endoh, Handbook of Fuel Cells—Fundamentals, Technology and Applications, John Wiley & Sons, Ltd. (2010).
D. Banham et al., J. Electrochem. Soc., 161, F1075-F1080 (2014).
Y. Zhu et al., J. Membr. Sci., 432, 66-72 (2013).
M. A. Hasan et al., Appl. Catal. A: General, 181, 171-179 (1999).
D. Zhao et al., J. Membr. Sci., 346, 143-151 (2010).
L. Gubler and W. H. Koppenol, J. Electrochem. Soc., 159, B211-B218 (2012).
P. Trogadas et al., Transition Metal Catalyst, J. Mater. Chem., 21, 19381-19388 (2011).
M. Aoki et al. et al., Electrochem. Commun. 8, 1509-1513 (2006).
N. Macauley et al., Electrochem. Lett., 2(4), F33-F35 (2013).
M. Watanabe et al., J. Electrochem. Soc., 145, 1137-1141 (1998).
D. Zhao et al., J. Power Sources, 195, 4606-4612 (2010).
V. Atrazhev et al., ECS Transactions, 1(8) 239-246 (2006).

* cited by examiner

ELECTROLYTE MEMBRANE WITH IMPROVED ION CONDUCTIVITY AND METHOD FOR MANUFACTURING THE SAME

CROSS-REFERENCE TO RELATED APPLICATION

This application claims under 35 U.S.C. § 119(a) the benefit of priority to Korean Patent Application No. 10-2020-0169407 filed on Dec. 7, 2020, the entire contents of which are incorporated herein by reference.

TECHNICAL FIELD

The present invention relates to an electrolyte membrane with improved ion conductivity and enhanced water transport and a method for manufacturing the same.

BACKGROUND

In general, a polymer electrolyte membrane is utilized for fuel cells and water electrolysis. Particularly, in terms of a polymer electrolyte membrane is used in a fuel cell for vehicles, in order to normally exhibit high output performance of tens of kW or greater under various driving conditions, the polymer electrolyte membrane must be operated stable within a wide range of current density.

A reaction to produce electricity in the fuel cell occurs in a membrane-electrode assembly (MEA) comprised of a perfluorinated sulfonic acid (PFSA) ionomer-based electrolyte membrane, and two electrodes, i.e., an anode and a cathode. Hydrogen is separated into protons and electrons after it is supplied to the anode, which is an oxidizing electrode. The protons are moved to the cathode, which is a reducing electrode, through the membrane, and the electrons are moved to the cathode through an external circuit. At the cathode, oxygen molecules, the protons and the electrons react together to produce electricity and further to generate water ($H_2O$) and heat as byproducts.

Crossover of hydrogen and oxygen, which are reactant gases of the fuel cell, through the electrolyte membrane may happen and, in this process, hydrogen peroxide (HOOH) may be produced. When hydrogen peroxide (HOOH) is decomposed into oxygen-containing radicals, such as the hydroxyl radical (·OH) and the hydroperoxyl radical (·OOH), these radicals attack the electrolyte membrane, and thus, leads to chemical degradation of the electrolyte membrane and consequently reduce durability of the fuel cell.

In the related art, in order to mitigate the chemical degradation of the electrolyte membrane, a method for adding various kinds of antioxidants to the electrolyte membrane has been being used. The antioxidants include primary antioxidants which function as radical scavengers or quenchers, and secondary antioxidants which function as hydrogen peroxide decomposers.

Cerium-based antioxidants, such as cerium oxides or ceria and cerium (III) nitrate hexahydrate, and terephthalic acid-based antioxidants, have been used as primary antioxidants in electrolyte membranes for fuel cells including polymer electrolyte membranes.

For example, the cerium oxides may be classified into pure cerium oxide ($CeO_2$) and modified cerium oxides. The modified cerium oxides include cerium-zirconium oxide ($CeZrO_x$), cerium-manganese oxide ($CeMnO_x$), cerium oxide doped silica, cerium oxide doped yttrium, cerium oxide doped zirconium oxide, etc.

Meanwhile, a representative secondary antioxidant used in the electrolyte membrane includes a manganese-based catalyst, such as manganese oxide, or a transition metal-based catalyst, such as platinum (Pt). In recent years, various research on addition of a platinum catalyst to the electrolyte membrane for fuel cells has been conducted.

Results of research to date reveal that durability of the electrolyte membrane may become high or low depending on the amount of platinum added to the electrolyte membrane, degree of distribution of the platinum, and microstructure of the platinum. For example, the platinum introduced into the electrolyte membrane converts hydrogen and oxygen crossing over into water before the hydrogen and the oxygen reach electrodes, whereby the amount of water in the electrolyte membrane is increased, proton conductivity is improved, and ultimately performance of the membrane-electrode assembly is improved. In addition, hydrogen and oxygen crossing over are blocked, whereby generation of radicals is prevented, or hydrogen peroxide generated in the electrolyte membrane is decomposed, whereby chemical durability of the electrolyte membrane is improved. However, the platinum introduced into the electrolyte membrane converts hydrogen peroxide into radicals or directly converts oxygen crossing over into radicals, whereby durability of the electrolyte membrane is reduced.

As described above, platinum may improve durability of the electrolyte membrane, but is difficult to have positive effects on performance of the electrolyte membrane or the membrane-electrode assembly. The reason for this is that platinum in the electrolyte membrane is mostly present in a state of being supported on a support, and the support generally employs condensed matter, such as carbon black, and thus disturbs movement of protons and water in the electrolyte membrane.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, provided is an electrolyte membrane with improved chemical durability by effectively removing hydrogen gas and oxygen gas, which cross over in the electrolyte membrane.

Further provided is an electrolyte membrane which has improved ion conductivity and enhanced water transport and thus eliminates performance decay that may happen due to addition of a catalyst.

In an aspect, provided is an electrolyte membrane including an ion transport layer including an ionomer having proton conductivity, and a catalyst dispersed in the ion transport layer. The catalyst may include a support including a shell configured to have a predetermined shape and size, an inner space, and one or more holes configured to allow the inner space to communicate with an outside therethrough, and a metal supported on the support.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazolebased polymer, a polyimide-based polymer, a polyetherimide-based polymer, a polyphenylene sulfide-based polymer, a polysulfone-based polymer, a polyethersulfone-based polymer, a polyetherketone-based polymer, a polyetheretherketone-based polymer, a polyphenylquinoxaline-based polymer and a polystyrene-based polymer.

The term "inner space", as used herein, refers to a space or vacancy formed inside a shell layer, which may be regularly or irregularly arranged. Further, the inner space may be formed by any kinds of material in the inner layer, whether inherently existed or subsequently added. For example, the inner space may be formed in various shapes of internal cavities such as a pore, an open-ended or closed hole, a labyrinth, a channel, or the like and made from inherent porous or hollow material.

The ionomer may suitably include a perfluorinated sulfonic acid (PFSA) ionomer.

The inner space may be filled with the ionomer.

The shell may suitably include one or more selected from the group consisting of carbon, silica, zeolite, and one or more transition metals selected from the group consisting of group 4B elements, group 5B elements, group 6B elements, group 7B elements, and group 8B elements, or an oxide or carbide thereof.

The support may suitably have a specific surface area of about 10 $m^2/g$ or greater.

The inner space may suitably have a size of about 2 nm or greater.

The metal may include one or more selected from the group consisting of platinum (Pt), osmium (Os), iridium (Ir), gold (Au), palladium (Pd), silver (Ag), magnesium (Mg), copper (Cu), nickel (Ni), cobalt (Co), titanium (Ti), and iron (Fe).

The catalyst may suitably include secondary particles formed by agglomerating primary particles including the support and the metal.

The catalyst may be formed in a particle, a sheet and a combination thereof.

A content of the catalyst in the electrolyte membrane may suitably be about 0.005 $mg/cm^2$ to 1.00 $mg/cm^2$.

The electrolyte membrane may further include an antioxidant dispersed in the ion transport layer, and the antioxidant may suitably include one or more selected from the group consisting of cerium-based antioxidants, and manganese-based antioxidants.

The electrolyte membrane may suitably include a reinforced layer impregnated with an ionomer, and the ion transport layer may be provided on at least one surface of the reinforced layer.

The ion transport layer may be provided on each of both surfaces of the reinforced layer, and the catalyst may be dispersed in at least one of the ion transport layers provided on the surfaces of the reinforced layer.

The ion transport layer may be provided in multiple layers, and the catalyst may suitably be dispersed in at least one of the ion transport layers.

In another aspect, provided is a method for manufacturing an electrolyte membrane. The method may include steps of: preparing a solution including a catalyst and an ionomer and forming an ion transport layer by applying the solution. The catalyst may include a support including a shell configured to have a predetermined shape and size, an inner space and one or more holes configured to allow the inner space to communicate with an outside therethrough, and a metal supported on the support.

The step of the preparing of the solution may include mixing the catalyst with the ionomer, preparing a catalyst complex powder by drying a mixture of the catalyst and the ionomer such that the inner space is filled with the ionomer, and preparing the solution by putting the catalyst complex powder together with the ionomer into a solvent.

The solution may further include an antioxidant including one or more selected from the group consisting of cerium-based antioxidants, and manganese-based antioxidants.

The ion transport layer may be formed by applying the solution to at least one surface of a reinforced layer impregnated with an ionomer.

Other aspects of the invention are disclosed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The above-described objects, other objects, advantages and features of the present invention will become apparent from the descriptions of embodiments given herein below with reference to the accompanying drawings. However, the present invention is not limited to the embodiments disclosed herein and may be implemented in various different forms. The embodiments are provided to make the description of the present invention thorough and to fully convey the scope of the present invention to those skilled in the art.

In the following description of the embodiments, the same elements are denoted by the same reference numerals even when they are depicted in different drawings. In the drawings, the dimensions of structures may be exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the invention. Singular expressions may encompass plural expressions, unless they have clearly different contextual meanings.

In the following description of the embodiments, terms, such as "including" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Figure 1:
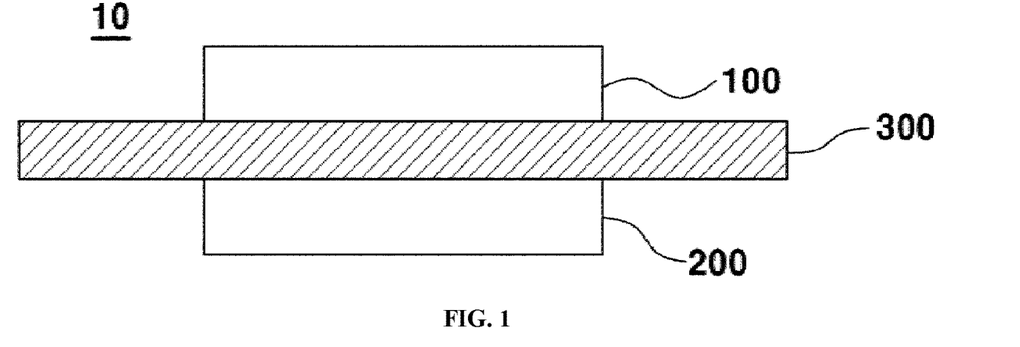
FIG. 1 shows an exemplary membrane-electrode assembly according an exemplary embodiment of to the present invention.

FIG. 1 is a cross-sectional view illustrating a membrane-electrode assembly (MEA) 10 according to an exemplary embodiment of the present invention. As shown in FIG. 1, the membrane-electrode assembly 10 includes a cathode 100, an anode 200, and an electrolyte membrane 300 located between the cathode 100 and the anode 200.

The cathode 100 and the anode 200 may include a catalyst, such as carbon-supported platinum (Pt). Further, the cathode 100 and the anode 200 may include an ion conductive polymer configured to conduct protons therein.

Figure 2:
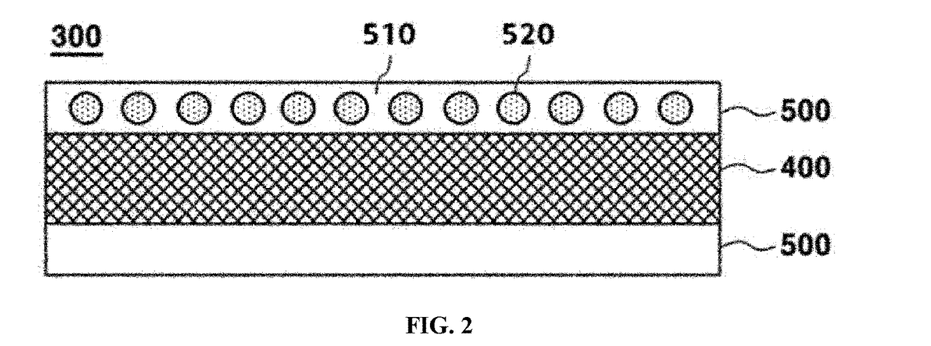
FIG. 2 shows an exemplary electrolyte membrane according to an exemplary embodiment of the present invention.

FIG. 2 is a cross-sectional view illustrating an exemplary electrolyte membrane 300 according to an exemplary embodiment of the present invention.

The electrolyte membrane 300 may include a reinforced layer 400 impregnated with an ionomer and an ion transport layer 500 provided on at least one surface of the reinforced layer 400, and a catalyst 520 may be dispersed in at least one of the ion transport layers 500.

The reinforced layer 400 serves to increase mechanical hardness of the electrolyte membrane 300. The reinforced layer 400 may be formed of a porous film having a great number of pores, and may thus be impregnated with the ionomer.

The reinforced layer 400 may include one or more selected from the group consisting of polytetrafluoroethylene (PTFE), expanded polytetrafluoroethylene (e-PTFE), polyethylene (PE), polypropylene (PP), poly(phenylene oxide) (PPO), polybenzimidazole (PBI), polyimide (PI), polyvinylidene fluoride (PVDF), and polyvinyl chloride (PVC).

The ion transport layer 500 includes an ionomer 510. The ionomer 510 may include any material which may transport protons. For example, the ionomer 510 may suitably include a perfluorinated sulfonic acid (PFSA) ionomer.

The catalyst 520 may be dispersed in the ion transport layer 500. The catalyst 520 may include a metal which has hydrogen peroxide decomposition activity, and a support thereof.

Figure 3:
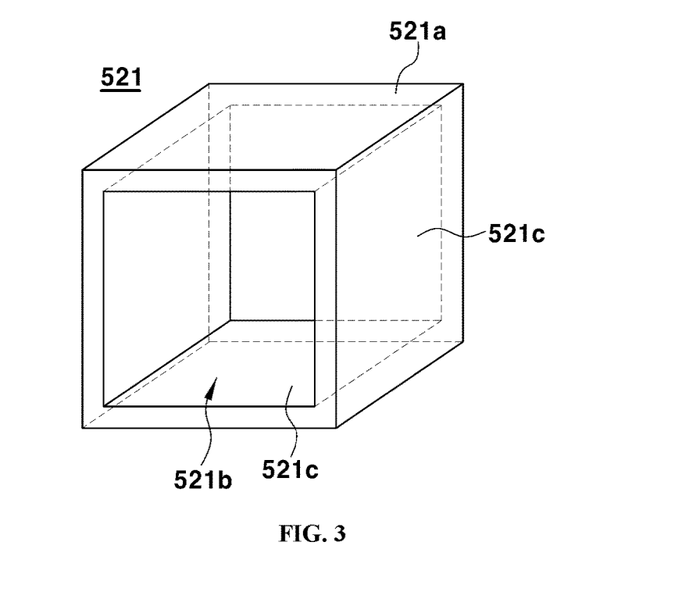
FIG. 3 shows an exemplary support according to an exemplary embodiment of the present invention.

FIG. 3 shows an exemplary support 521 according to an exemplary embodiment of the present invention. The support 521 may include a shell 521a which has a polyhedral shape, such as a hexahedron, and is the inner space, for example, hollow, and one or more holes 521c through which the inner space 521b communicates with the outside.

Figure 4:
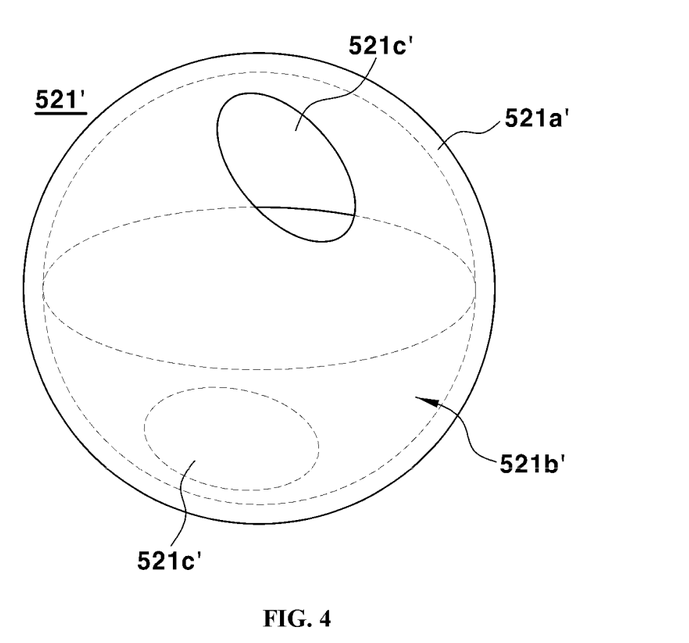
FIG. 4 shows an exemplary support according to an exemplary embodiment of the present invention.

FIG. 4 is a perspective view illustrating another exemplary support 521' according to the present invention. The support 521' may include a shell 521a' which has a spherical shape and is hollow, and at least one hole 521c' through which an inner space 521b' communicates with the outside.

The support according to the present invention is not limited to the shapes shown in FIGS. 3 and 4, and it will be interpreted that any modifications of the support, which have a designated shape and size and are hollow so as to exhibit the effects of the present invention, may be within the scope of the present invention.

Hereinafter, the support 521 will be exemplarily described in more detail, but the configuration of the support 521 may be applied to the support 521' and other modified supports.

The inner space 521b may be filled with the ionomer 510. In the electrolyte membrane 300, protons are transported through the ionomer 510. Therefore, in order to effectively transport protons, the inside of the electrolyte membrane 300 must be uniformly filled with the ionomer 510. Further, because water produced at the cathode 100 is also moved to the anode 200 through the ionomer 510, dispersion of the ionomer 510 in the electrolyte membrane 300 is important in water transport. However, a catalyst added to increase chemical durability of an electrolyte membrane may disturb transport of protons and of water. Particularly, when a support of the catalyst has no pores or has pores with a size of about 1 nm, the ionomer 510 cannot be uniformly filled in the electrolyte membrane. Therefore, the present invention is characterized, as shown in FIGS. 3 and 4, in that the catalyst 520 including the support 521 configured to be hollow and to have the inner space 521b communicating with the outside through the hole 521c is used, and the inside of the catalyst 520 may be filled with the ionomer 510 so that, even when the catalyst 520 is added to the electrolyte membrane 300, proton conductivity and water transport in the electrolyte membrane 300 may not be reduced.

The shell 521a may include one or more selected from the group consisting of carbon, silica, zeolite, and one or more transition metals selected from the group consisting of group 4B elements, group 5B elements, group 6B elements, group 7B elements, group 8B elements, or an oxide or carbide thereof and particularly, may include carbon.

The support 521 may have a specific surface area of about 10 m$^2$/g or greater. The upper limit of the specific surface area is not limited to a specific value and, for example, the specific surface area of the support 521 may be equal to or less than about 1,500 m$^2$/g, equal to or less than about 1,000 m$^2$/g, or equal to or less than about 800 m$^2$/g. When the specific surface area of the support 521 is less than about 10 m$^2$/g, the metal supported on the support 521 may be insufficient.

The inner space 521b may have a size of about 2 nm or greater. In the description of the present invention, the size of the inner space 521b means the longest distance out of distances from any one point on the inner surface to another point on the inner surface. Further, the above-described size value of the inner space 521b is the average of the sizes of the inner spaces 521b. The upper limit of the size of the inner space 521b is not limited to a specific value and, for example, the size of the inner space 521b may be equal to or less than about 500 nm, equal to or less than about 300 nm, or equal to or less than about 150 nm. When the size of the inner space 521b is less than about 2 nm, the catalyst 520 may disturb movement of protons and of water.

The metal M may be supported on the support 521. The metal M may have hydrogen peroxide decomposition activity. Therefore, the metal M may reduce the amount of hydrogen gas and the amount of oxygen gas which cross over in the electrolyte membrane 300, thereby being capable of improving chemical durability of the electrolyte membrane 300.

The metal M may include one or more selected from the group consisting of platinum (Pt), osmium (Os), iridium (Ir), gold (Au), palladium (Pd), silver (Ag), magnesium (Mg), copper (Cu), nickel (Ni), cobalt (Co), titanium (Ti), and iron (Fe).

Figure 5:
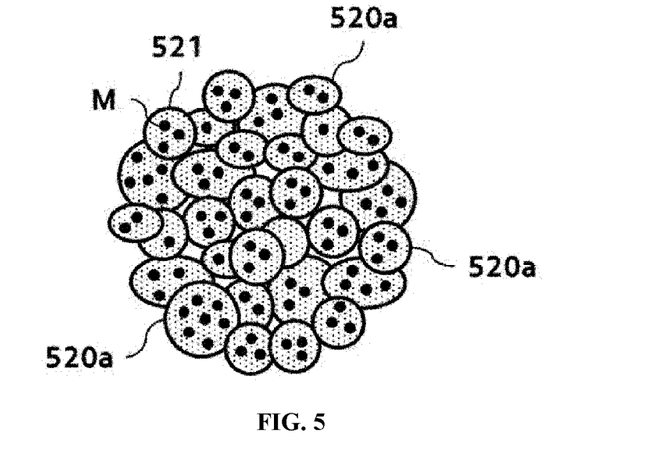
FIG. 5 shows an exemplary particle-type catalyst according to an exemplary embodiment of the present invention.
Figure 6:
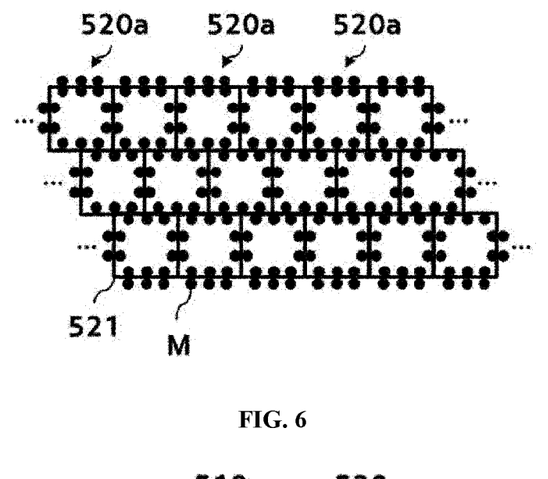
FIG. 6 shows an exemplary sheet-type catalyst according to an exemplary embodiment of the present invention.

The support 521 and the metal M supported thereon may be primary particles. The catalyst 520 may include secondary particles formed by agglomerating the primary particles. Particularly, the catalyst 520 may be configured in the form of particles in which the primary particles 520a are agglomerated, as shown in FIG. 5. Otherwise, the catalyst 520 may be configured in the form of a sheet in which the primary particles 520a are agglomerated, as shown in FIG. 6.

The electrolyte membrane 300 may include about 0.005 mg/cm$^2$ to 1.00 mg/cm$^2$ of the catalyst 520. When the amount of the catalyst 520 is less than the above range, effect of improving chemical durability may not be sufficient, and when the amount of the catalyst 520 exceeds the above range, proton conductivity and water transport may be reduced because it is difficult to secure insulating properties of the catalyst 520 in the ion transport layer 500.

The electrolyte membrane 300 may further include an antioxidant dispersed in the ion transport layer 500.

The antioxidant may include one or more selected from the group consisting of cerium-based antioxidants, and manganese-based antioxidants.

The cerium-based antioxidants may include cerium oxide, cerium (III) nitrate hexahydrate, and the like.

The manganese-based antioxidants may include manganese oxide, and the like.

Figure 7:
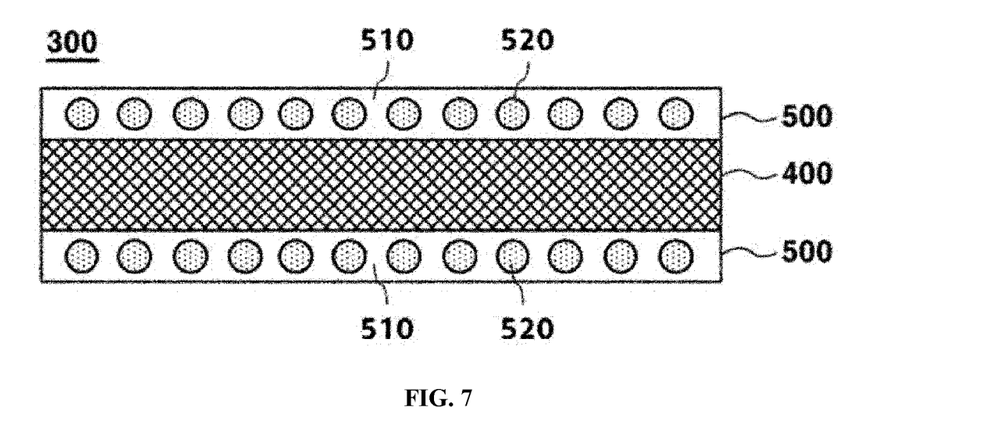
FIG. 7 is a cross-sectional view illustrating an exemplary electrolyte membrane according to an exemplary embodiment of the present invention.

FIG. 7 is a cross-sectional view illustrating an exemplary electrolyte membrane 300 according to an exemplary embodiment of the present invention. The electrolyte membrane 300 may include ion transport layers 500 respectively provided on both surfaces of a reinforced layer 400, and a catalyst 520 may be dispersed in all of the ion transport layers 500.

Figure 8:
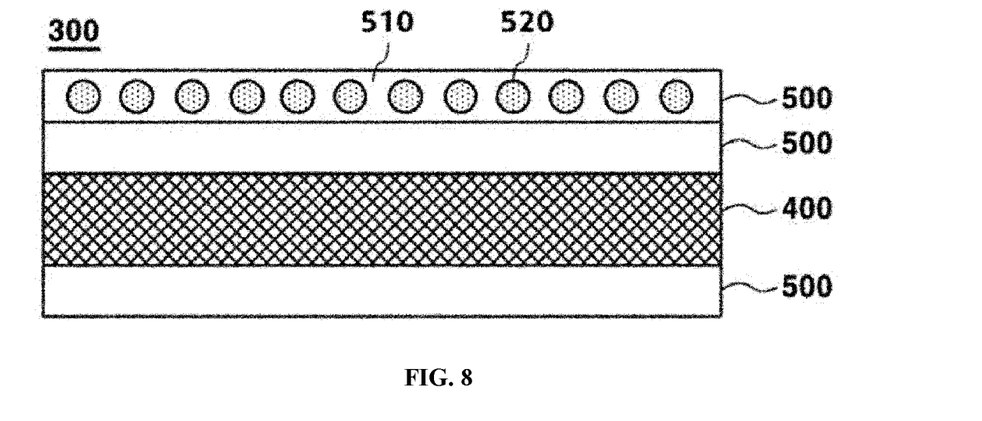
FIG. 8 is a cross-sectional view illustrating an exemplary electrolyte membrane according to an exemplary embodiment of the present invention.

FIG. 8 is a cross-sectional view illustrating an exemplary electrolyte membrane 300 according to an exemplary embodiment of the present invention. The electrolyte membrane 300 may include a plurality of ion transport layers 500, and a catalyst 520 may be dispersed in at least one of the ion transport layers 500.

Figure 9:
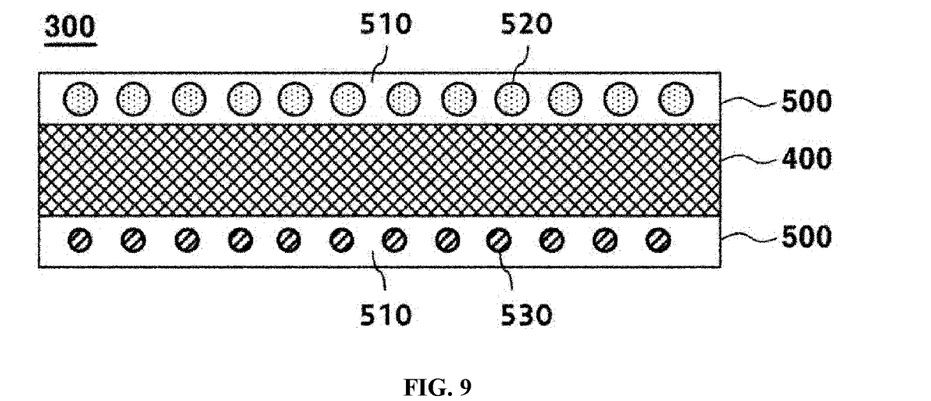
FIG. 9 is a cross-sectional view illustrating an exemplary electrolyte membrane according to an exemplary embodiment of the present invention.

FIG. 9 is a cross-sectional view illustrating an exemplary electrolyte membrane 300 according to an exemplary embodiment of the present invention. The electrolyte membrane 300 may include ion transport layers 500 respectively provided on both surfaces of a reinforced layer 400, a catalyst 520 may be dispersed in one of the ion transport layers 500, and primary antioxidants which function as radical scavengers or quenchers 530 may be dispersed in the other of the ion transport layers 500.

Figure 10:
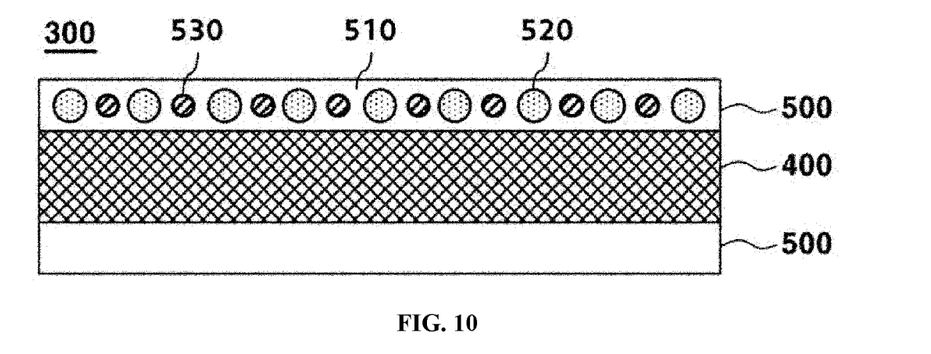
FIG. 10 is a cross-sectional view illustrating an exemplary electrolyte membrane according to an exemplary embodiment of the present invention.

FIG. 10 is a cross-sectional view illustrating an exemplary electrolyte membrane 300 according to an exemplary embodiment of the present invention. The electrolyte membrane 300 may include ion transport layers 500 respectively provided on both surfaces of a reinforced layer 400, and both a catalyst 520 and a primary antioxidant 530 may be dispersed in one of the ion transport layers 500.

Figure 11:
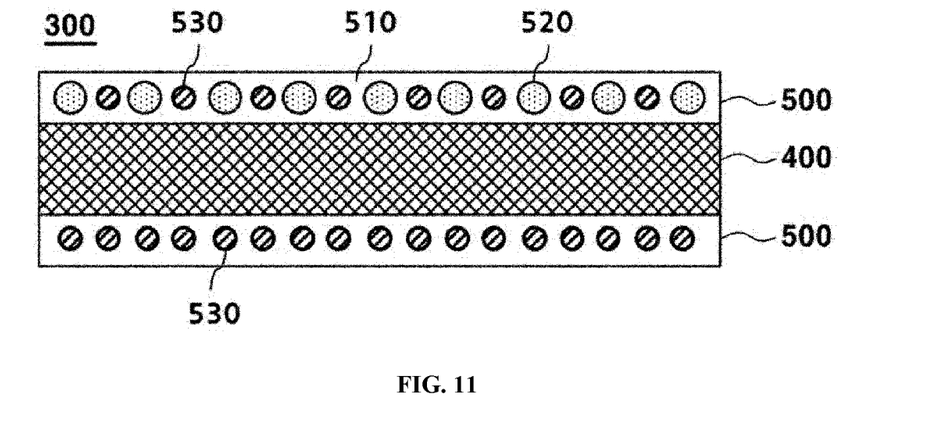
FIG. 11 is a cross-sectional view illustrating an exemplary electrolyte membrane according to an exemplary embodiment of the present invention.

FIG. 11 is a cross-sectional view illustrating an exemplary electrolyte membrane 300 according to an exemplary embodiment of the present invention. The electrolyte membrane 300 may include ion transport layers 500 respectively provided on both surfaces of a reinforced layer 400, both a catalyst 520 and a primary antioxidant 530 may be dispersed in one of the ion transport layers 500, and the primary antioxidant 530 alone may be dispersed in the other of the ion transport layers 500.

Figure 12:
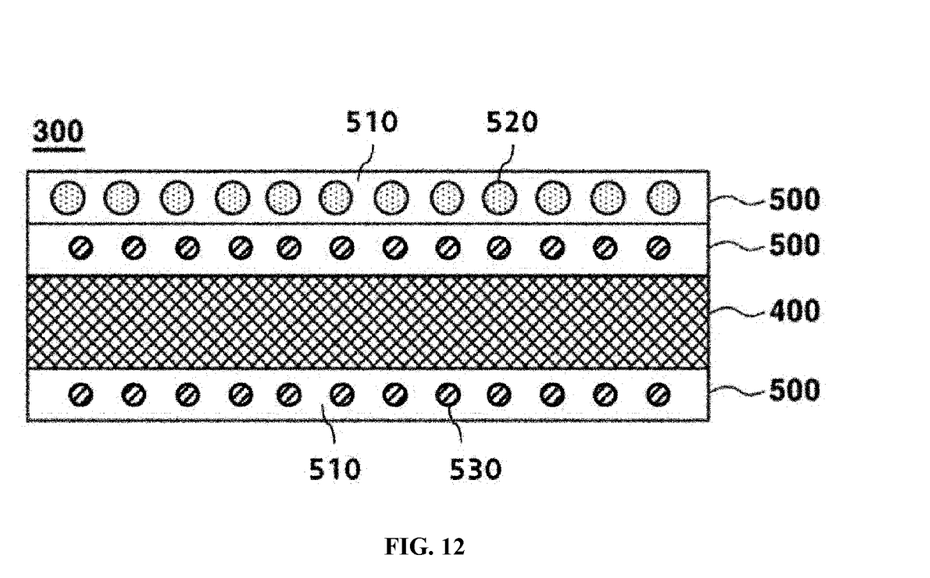
FIG. 12 is a cross-sectional view illustrating an exemplary electrolyte membrane according to an exemplary embodiment of the present invention.

FIG. 12 is a cross-sectional view illustrating an exemplary electrolyte membrane 300 according to an exemplary embodiment of the present invention. The electrolyte membrane 300 may include a plurality of ion transport layers 500, a catalyst 520 may be dispersed in at least one of the ion transport layers 500, and a primary antioxidant 530 alone may be dispersed in two or more of the ion transport layers 500.

Figure 13:
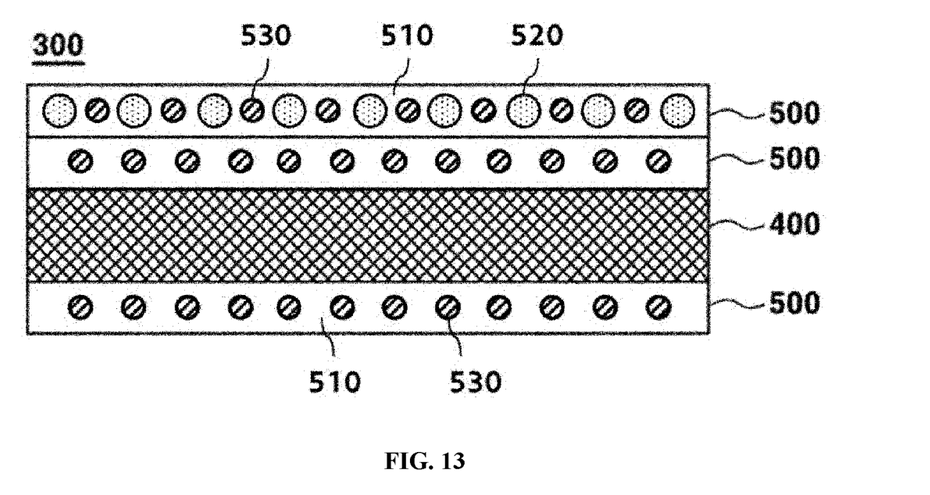
FIG. 13 is a cross-sectional view illustrating an exemplary electrolyte membrane according to an exemplary embodiment of the present invention.

FIG. 13 is a cross-sectional view illustrating an exemplary electrolyte membrane 300 according to an exemplary embodiment of the present invention. The electrolyte membrane 300 may include a plurality of ion transport layers 500, both a catalyst 520 and a primary antioxidant 530 may be dispersed in at least one of the ion transport layers 500, and the primary antioxidant 530 alone may be dispersed in two or more of the ion transport layers 500.

A method for manufacturing an electrolyte membrane may include preparing a solution including a catalyst and an ionomer, and forming an ion transport layer by applying the solution. The catalyst and the ionomer have already been described above and a detailed description thereof will thus be omitted.

The solution may be prepared by putting the catalyst and the ionomer into a solvent.

Further, the solution may be prepared by mixing the catalyst with the ionomer, preparing a catalyst complex powder by drying the acquired mixture such that the inner space of the catalyst is filled with the ionomer, and putting the catalyst complex powder together with the ionomer into the solvent.

The solution may further include a primary antioxidant including one or more selected from the group consisting of cerium-based antioxidants, and manganese-based antioxidants.

When the catalyst is mixed with the ionomer, the primary antioxidant together with the catalyst may be put into the ionomer so as to be mixed with the ionomer.

The ion transport layer may be formed by forming a layer having a designated shape by applying the solution to a base material, such as release film, and then transferring the layer to one surface of a reinforced layer impregnated with an ionomer.

Alternatively, the ion transport layer may be formed by applying the solution directly to the reinforced layer impregnated with the ionomer.

Otherwise, the ion transport layer may be formed by impregnating the reinforced layer directly with the solution.

The method for manufacturing the electrolyte membrane may further include drying and heat-treating the ion transport layer, after formation of the ion transport layer.

The ion transport layer may be dried at a temperature of less than about 100° C. for about 30 minutes or longer. When the drying temperature of the ion transport layer is excessively high, the ionomer may be pyrolyzed and, when the drying time of the ion transport layer is excessively short, the solvent may not be dried.

Further, the ion transport layer may be heat-treated at a temperature of about 110° C. or greater for about 20 minutes or shorter. When the heat-treatment time of the ion transport layer is excessively long, the ionomer may be pyrolyzed.

EXAMPLE

Hereinafter, the present invention will be described in more detail through the following examples. The following examples serve merely to exemplarily describe the present invention and are not intended to limit the scope of the invention.

Example 1

An electrolyte membrane having the configuration shown in FIG. 2 was manufactured. Particularly, a catalyst in which platinum was supported on a carbon support having the configuration shown in FIG. 3 and having the size of the inner space thereof, that was about 4 nm, was used.

A solution was prepared by mixing the catalyst with an ionomer, an ion transport layer was formed by applying the solution to a reinforced layer impregnated with an ionomer, and thereby, manufacture of the electrolyte membrane was completed.

A membrane-electrode assembly was acquired by bonding a cathode and an anode to the electrolyte membrane.

Example 2

An electrolyte membrane and a membrane-electrode assembly including the same were manufactured in the same way as in Example 1 except that a carbon support having the size of the inner space thereof, that is about 150 nm, was used.

Comparative Example 1

An electrolyte membrane and a membrane-electrode assembly including the same were manufactured in the same way as in Example 1 except that no catalyst was used.

Comparative Example 2

An electrolyte membrane and a membrane-electrode assembly including the same were manufactured in the same way as in Example 1 except that a carbon support having the size of the inner space thereof, that is about 1 nm, was used.

Comparative Example 3

An electrolyte membrane and a membrane-electrode assembly including the same were manufactured in the same way as in Example 1 except that a carbon support having a high graphitization degree and the size of the inner space thereof, that is less than about 1 nm, was used.

Test Example 1

Figure 14:
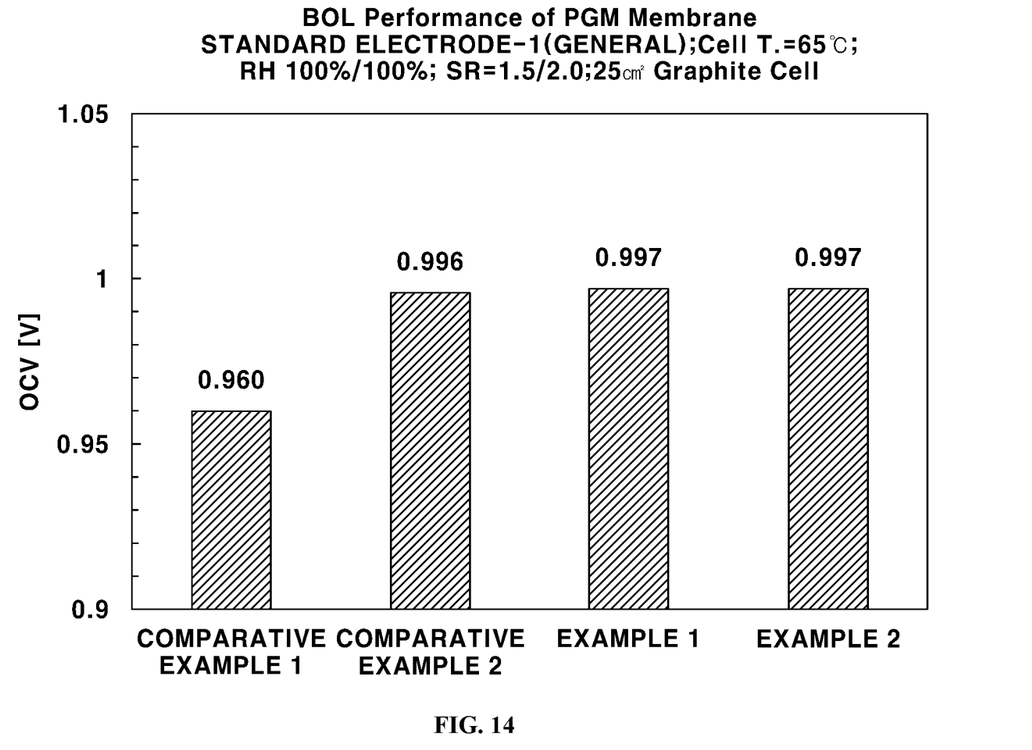
FIG. 14 is a graph showing results of measurement of open circuit voltages (OCVs) of fuel cells including membrane-electrode assemblies in Example 1, Example 2, Comparative Example 1 and Comparative Example 2.

Open circuit voltages (OCVs) of fuel cells respectively including the membrane-electrode assemblies according to example 1, example 2, comparative example 1 and comparative example 2 were measured. The measurement results are shown in FIG. 14. Referring to this figure, it may be confirmed that the fuel cells respectively including the membrane-electrode assemblies according to example 1, example 2 and comparative example 2 exhibit high OCVs compared to the fuel cell including the membrane-electrode assembly according to comparative example 1, and it means that hydrogen gas and oxygen gas which cross over during operation of the fuel cells are effectively removed.

Test Example 2

Ion conductivities of the electrolyte membranes according to example 1, example 2, comparative example 1, comparative example 2 and comparative example 3 were measured. Here, ion conductivity is an index showing proton conductivity of each of the electrolyte membranes.

Figure 15:
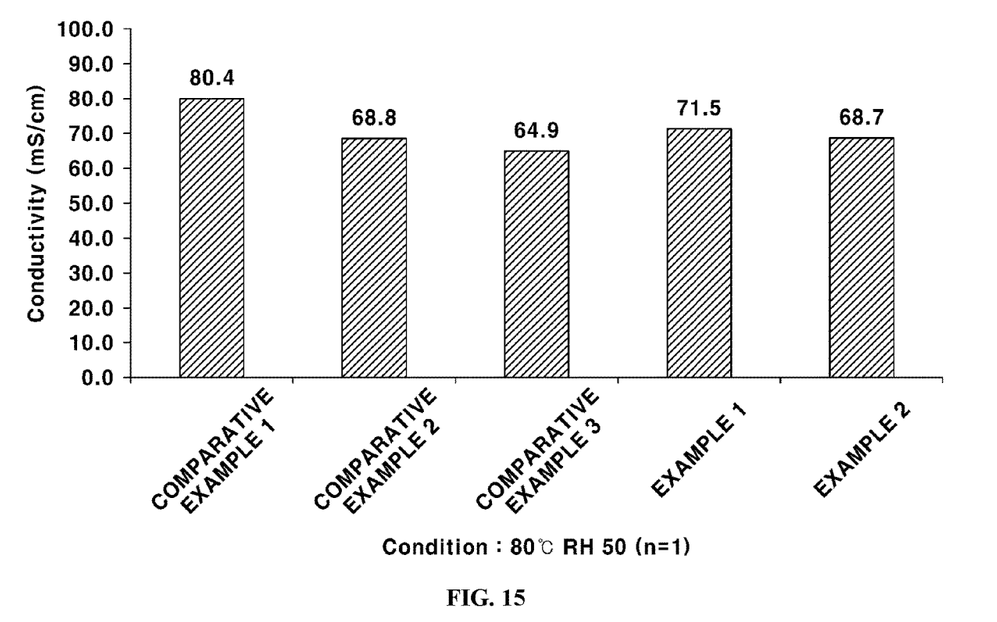
FIG. 15 is a graph showing results of measurement of ion conductivities of the membrane-electrode assemblies in Example 1, Example 2, Comparative Example 1, Comparative Example 2 and Comparative Example 3 at a temperature of 80° C. and a relative humidity of 50%.

FIG. 15 is a graph showing results of measurement of ion conductivities of the respective electrolyte membranes at a temperature of 80° C. and a relative humidity of 50%. According to FIG. 15, in comparison among the electrolyte membranes according to Example 1, Example 2, Comparative Example 2 and Comparative Example 3, in which the catalyst is used, except for the electrolyte membrane according to Comparative Example 1, in which no catalyst is used, the electrolyte membranes according to Example 1 and Example 2 exhibit ion conductivities equivalent to or greater than the electrolyte membranes according to Comparative Example 2 and Comparative Example 3.

According to various exemplary embodiments of the present invention, the electrolyte membrane may effectively remove hydrogen gas and oxygen gas, which cross over in the electrolyte membrane, and thus have improved chemical durability.

Further, the electrolyte membrane according to exemplary embodiments of the present invention may have improved ion conductivity and water transport, and thus eliminate performance decay that may happen due to addition of a catalyst.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A membrane-electrode assembly, comprising:
    a cathode;
    an anode; and
    an electrolyte membrane located between cathode and the anode, wherein the electrolyte membrane comprises:
        an ion transport layer comprising an ionomer having proton conductivity; and
        a catalyst dispersed in the ion transport layer, wherein the catalyst comprises:
            a support comprising a shell configured to have a predetermined shape and size; an inner space; and one or more holes configured to allow the inner space to communicate with an outside therethrough; and
            a metal supported on the support;
        wherein the inner space is filled with the ionomer.

2. The membrane-electrode assembly of claim 1, wherein the ionomer comprises a perfluorinated sulfonic acid (PFSA) ionomer.

3. The membrane-electrode assembly of claim 1, wherein the shell comprises one or more selected from the group consisting of carbon, silica, zeolite, and one or more transition metals selected from the group consisting of group 4B elements, group 5B elements, group 6B elements, group 7B elements, and group 8B elements, an oxide thereof, and a carbide thereof.

4. The membrane-electrode assembly of claim 1, wherein the support has a specific surface area of about 10 $m^2/g$ or greater.

5. The membrane-electrode assembly of claim 1, wherein the inner space has a size of about 2 nm or greater.

6. The membrane-electrode assembly of claim 1, wherein the metal comprises one or more selected from the group consisting of platinum (Pt), osmium (Os), iridium (Ir), gold (Au), palladium (Pd), silver (Ag), magnesium (Mg), copper (Cu), nickel (Ni), cobalt (Co), titanium (Ti), and iron (Fe).

7. The membrane-electrode assembly of claim 1, wherein the catalyst comprises secondary particles formed by agglomerating primary particles comprising the support and the metal.

8. The membrane-electrode assembly of claim 1, wherein the catalyst is formed in a particle, a sheet and a combination thereof.

9. The membrane-electrode assembly of claim 1, wherein a content of the catalyst in the electrolyte membrane is about 0.005 $mg/cm^2$ to 1.00 $mg/cm^2$.

10. The membrane-electrode assembly of claim 1, further comprising an antioxidant dispersed in the ion transport layer, wherein the antioxidant comprises one or more selected from the group consisting of cerium-based antioxidants, manganese-based antioxidants and combinations thereof.

11. The membrane-electrode assembly of claim 1, further comprising a reinforced layer impregnated with an ionomer, wherein the ion transport layer is provided on at least one surface of the reinforced layer.

12. The membrane-electrode assembly of claim 11, wherein the ion transport layer is provided on each of both surfaces of the reinforced layer, and the catalyst is dispersed in at least one of the ion transport layers provided on the surfaces of the reinforced layer.

13. The membrane-electrode assembly of claim 11, wherein the ion transport layer is provided in multiple layers, and the catalyst is dispersed in at least one of the ion transport layers.

14. A method for manufacturing a membrane-electrode assembly, comprising:
    producing an electrolyte membrane; and
    bonding a cathode and an anode to the electrolyte membrane;
    wherein producing the electrolyte membrane comprises:
        preparing a solution comprising a catalyst and an ionomer; and
        forming an ion transport layer by applying the solution, wherein the catalyst comprises:
            a support comprising a shell configured to have a predetermined shape and size; an inner space; and one or more holes configured to allow the inner space to communicate with an outside therethrough; and
            a metal supported on the support;
        wherein the inner space is filled with the ionomer.

15. The method of claim 14, wherein the catalyst comprises secondary particles formed by agglomerating primary particles comprising the support and the metal.

16. The method of claim 14, wherein the inner space has a size of about 2 nm or greater.

17. The method of claim 14, wherein the preparing the solution comprises:
    mixing the catalyst with the ionomer;
    preparing a catalyst complex powder by drying a mixture of the catalyst and the ionomer such that the inner space is filled with the ionomer; and
    preparing the solution by putting the catalyst complex powder together with the ionomer into a solvent.

18. The method of claim 14, wherein the solution further comprises an antioxidant comprising at one or more selected from the group consisting of cerium-based antioxidants, and manganese-based antioxidants.

19. The method of claim 14, wherein the ion transport layer is formed by applying the solution to at least one surface of a reinforced layer impregnated with an ionomer.

* * * * *